(12) United States Patent
Gu et al.

(10) Patent No.: US 12,079,102 B2
(45) Date of Patent: Sep. 3, 2024

(54) SYSTEMS, METHODS, AND MEDIA FOR PROVING THE CORRECTNESS OF SOFTWARE ON RELAXED MEMORY HARDWARE

(71) Applicants: Ronghui Gu, New York, NY (US); Jason Nieh, New York, NY (US); Runzhou Tao, New York, NY (US)

(72) Inventors: Ronghui Gu, New York, NY (US); Jason Nieh, New York, NY (US); Runzhou Tao, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 80 days.

(21) Appl. No.: 17/376,120

(22) Filed: Jul. 14, 2021

(65) Prior Publication Data
US 2022/0019514 A1 Jan. 20, 2022

Related U.S. Application Data

(60) Provisional application No. 63/190,674, filed on May 19, 2021, provisional application No. 63/051,710, filed on Jul. 14, 2020.

(51) Int. Cl.
*G06F 11/36* (2006.01)
(52) U.S. Cl.
CPC .............. *G06F 11/3604* (2013.01)
(58) Field of Classification Search
CPC .................................................. G06F 11/3604

(Continued)

(56) References Cited

U.S. PATENT DOCUMENTS 6,810,442 B1 * 10/2004 Lin .................. G06F 30/331
710/52
7,869,425 B2 * 1/2011 Elliott .................. H04L 47/10
709/228

(Continued)

FOREIGN PATENT DOCUMENTS

WO WO 2019108676 6/2019

OTHER PUBLICATIONS

Adve, Sarita V., and Kourosh Gharachorloo. "Shared memory consistency models: A tutorial." computer 29.12 (1996): pp. 66-76. (Year: 1996).*

(Continued)

*Primary Examiner* — Satish Rampuria
(74) *Attorney, Agent, or Firm* — Byrne Poh LLP (57) ABSTRACT

Mechanisms for proving the correctness of software on relaxed memory hardware are provided, the mechanisms comprising: receiving a specification, a hardware model, and an implementation for the software to be executed on the relaxed memory hardware; evaluating the software using a sequentially consistent hardware model; evaluating the software using a relaxed memory hardware model and at least one of the following conditions: a data-race-free (DRF)-kernel condition; a no-barrier-misuse condition; a memory-isolation condition; a transactional-page-table condition; a write-once-kernel-mapping condition; and a weak-memory-isolation condition; and outputting an indication of whether the software is correct based on the evaluating the software using the sequentially consistent hardware model and the evaluating the software using the relaxed memory hardware model.

18 Claims, 5 Drawing Sheets

(58) Field of Classification Search
USPC .................................................. 717/120–178
See application file for complete search history.

(56) References Cited

U.S. PATENT DOCUMENTS

| | | | |
|---|---|---|---|
| 7,877,659 | B2 | 1/2011 | Geller et al. |
| 7,895,643 | B2 | 2/2011 | Yung et al. |
| 8,117,445 | B2 | 2/2012 | Werner et al. |
| 8,656,482 | B1 | 2/2014 | Tosa et al. |
| 9,009,823 | B1 | 4/2015 | Ismael et al. |
| 9,525,666 | B2 | 12/2016 | Inforzato et al. |
| 9,665,708 | B2 | 5/2017 | Fanton et al. |
| 10,235,175 | B2* | 3/2019 | Dixon ................. G06F 12/0862 |
| 10,331,829 | B2* | 6/2019 | Kailas ................... G06F 30/327 |
| 10,496,574 | B2* | 12/2019 | Fleming .............. G06F 12/0813 |
| 10,650,174 | B1* | 5/2020 | Wilmot ............... G06F 30/3308 |
| 2006/0047958 | A1 | 3/2006 | Morais |
| 2009/0043985 | A1 | 2/2009 | Tuuk |
| 2009/0328045 | A1* | 12/2009 | Burckhardt ........... G06F 9/3834 |
| | | | 711/E12.001 |
| 2009/0328195 | A1 | 12/2009 | Smith |
| 2010/0114618 | A1* | 5/2010 | Wilcock ........... G06Q 10/06375 |
| | | | 705/348 |
| 2012/0144376 | A1* | 6/2012 | Van Eijndhoven ..... G06F 8/456 |
| | | | 717/146 |
| 2015/0254330 | A1* | 9/2015 | Chan ..................... G06F 16/273 |
| | | | 707/613 |
| 2015/0370591 | A1 | 12/2015 | Tuch et al. |
| 2016/0275016 | A1 | 9/2016 | Mukherjee |
| 2017/0024508 | A1 | 1/2017 | Mneimneh et al. |
| 2018/0332064 | A1 | 11/2018 | Harris et al. |
| 2020/0167467 | A1 | 5/2020 | Saxena et al. |
| 2020/0409740 | A1 | 12/2020 | Li et al. |
| 2021/0067526 | A1 | 3/2021 | Fahrny et al. |

OTHER PUBLICATIONS

Park, Seungjoon, and David L. Dill. "An executable specification and verifier for relaxed memory order." IEEE Transactions on Computers 48.2 (1999): pp. 227-235. (Year: 1999).*

Hsu, Terry Ching-Hsiang. "Memory Subsystems for Security, Consistency, and Scalability." (2018).pp. 1-135 (Year: 2018).*

Jin, Xinxin, et al. "FTXen: Making hypervisor resilient to hardware faults on relaxed cores." 2015 IEEE 21st International Symposium on High Performance Computer Architecture (HPCA). IEEE, 2015. pp. 451-462 (Year: 2015).*

Ševčík, Jaroslav, et al. "Relaxed-memory concurrency and verified compilation." Proceedings of the 38th annual ACM SIGPLAN-SIGACT symposium on Principles of programming languages. 2011.pp. 43-54 (Year: 2011).*

Romanescu, Bogdan F., Alvin R. Lebeck, and Daniel J. Sorin. "Specifying and dynamically verifying address translation-aware memory consistency." ACM Sigplan Notices 45.3 (2010): 323-334. (Year: 2010).*

Zhang, Hongce, et al. "ILA-MCM: integrating memory consistency models with instruction-level abstractions for heterogeneous system-on-chip verification." 2018 Formal Methods in Computer Aided Design (FMCAD). IEEE, 2018.pp. 1-10 (Year: 2018).*

Abts, Dennis, Steve Scott, and David J. Lilja. "So many states, so little time: Verifying memory coherence in the Cray X1." Proceedings International Parallel and Distributed Processing Symposium. IEEE, 2003.pp. 1-10 (Year: 2003).*

Chen, Kaiyu, Sharad Malik, and Priyadarsan Patra. "Runtime validation of memory ordering using constraint graph checking." 2008 IEEE 14th International Symposium on High Performance Computer Architecture. IEEE, 2008.pp.415-426 (Year: 2008).*

Accetta, M., et al., "Mach: A New Kernel Foundation For UNIX Development", In Proceedings of the Summer USENIX Conference, Atlanta, GA, US, Jun. 1986, pp. 1-16.

Adams, K. and Agesen, O., "A Comparison of Software and Hardware Techniques for x86 Virtualization", In ACM SIGPLAN Notices, vol. 41, No. 11, Nov. 2006, pp. 2-13.

Advanced Micro Devices, "Secure Encrypted Virtualization API Version 0.16", Technical Report, Feb. 2018, pp. 1-99, available at: http://developer.amd.com/wordpress/media/2017/11/55766_SEV-KM-API_Specification.pdf.

Alglave, J., et al., "Software Verification for Weak Memory via Program Transformation", In Proceedings of the 22nd European Conference on Programming Languages and Systems, Rome, IT, Mar. 16-24, 2013, pp. 1-21.

Amazon Web Services, "AWS Key Management Service (KMS)", last accessed Jul. 26, 2021, pp. 1-7, available at: https://aws.amazon.com/kms/.

Amazon Web Services, "Introducing Amazon EC2 A1 Instances Powered By New Arm-based AWS Graviton Processors", Nov. 26, 2018, pp. 1-3, available at: https://aws.amazon.com/about-aws/whats-new/2018/11/introducing-amazon-ec2-a1-instances/.

Archwiki, "dm-crypt", last updated Jun. 9, 2021, pp. 1-2, available at: https://wiki.archlinux.org/title/dm-crypt.

ARM Ltd., "ARM Security Technology: Building a Secure System using TrustZone Technology", Technical Report, Apr. 2009, pp. 1-108.

ARM Ltd., "ARM System Memory Management Unit Architecture Specification: SMMU Architecture Version 2.0", Technical Report, Jun. 2016, pp. 1-372.

Azab, A.M., et al., "HyperSentry: Enabling Stealthy In-Context Measurement of Hypervisor Integrity", In Proceedings of the 17th ACM Conference on Computer and Communications Security, Chicago, IL, US, Oct. 4-8, 2010, pp. 1-12.

Backes, M., et al., "Preventing Side-Channel Leaks in Web Traffic: A Formal Approach", In Proceedings of the 20th Annual Network and Distributed System Security Symposium (NDSS 2013), San Diego, CA, US, Feb. 24-27, 2013, pp. 1-17.

Barham, P., et al., "Xen and the Art of Virtualization", In Proceedings of the 19th ACM Symposium on Operating Systems Principles (SOSP '03), Bolton Landing, NY, US, Oct. 19-22, 2003, pp. 1-14.

Batty, M., et al., "The Problem of Programming Language Concurrency Semantics", In Proceedings of the European Symposium on Programming Languages and Systems, London, UK, Apr. 11-18, 2015, pp. 1-25.

Baumann, A., et al., "Shielding Applications from an Untrusted Cloud with Haven", In Proceedings of the 11th USENIX Conference on Operating Systems Design and Implementation, Broomfield, CO, US, Oct. 6-8, 2014, pp. 1-19.

Baumann, C., et al., "A High Assurance Virtualization Platform for ARMv8", In Proceedings of the European Conference on Networks and Communications, Athens, GR, Jun. 27-30, 2016, pp. 1-6.

Baumann, C., et al., "On the Verification of System-level Information Flow Properties for Virtualized Execution Platforms", In Journal of Cryptographic Engineering, vol. 9, May 25, 2019, pp. 243-261.

Bershad, B.N., et al., "Extensibility Safety and Performance in the SPIN Operating System", In Proceedings of the 15th ACM Symposium on Operating Systems Principles, Copper Mountain, CO, US, Dec. 3-6, 1995, pp. 1-18.

Biba, K.J., "Integrity Considerations for Secure Computer Systems", Technical Report, The Mitre Corporation, Apr. 1977, pp. 1-68.

Bilzor, M., et al., "Evaluating Security Requirements in a General-Purpose Processor by Combining Assertion Checkers with Code Coverage", In Proceedings of the IEEE International Symposium on Hardware-Oriented Security and Trust, San Francisco, CA, US, Jun. 3-4, 2012, pp. 49-54.

Burckhardt, S. and Musuvathi, M., "Effective Program Verification for Relaxed Memory Models", In Proceedings of the 20th International Conference on Computer Aided Verification, Princeton, NJ, US, Jul. 7-14, 2008, pp. 1-14.

Business Wire, "Research and Markets: Global Encryption Software Market (Usage, Vertical and Geography)—Size, Global Trends, Company Profiles, Segmentation and Forecast, 2013-2020", Feb. 11, 2015, pp. 1-3.

Butt, S., et al., "Self-Service Cloud Computing", In Proceedings of the ACM Conference on Computer and Communications Security, Raleigh, NC, US, Oct. 16-18, 2012, pp. 1-78.

(56) References Cited

OTHER PUBLICATIONS

Chajed, T., et al., "Verifying Concurrent, Crash-Safe Systems with Perennial", In Proceedings of the 27th ACM Symposium on Operating Systems Principles, Huntsville, ON, Canada, Oct. 27-30, 2019, pp. 1-16.

Chen, H., et al., "Using Crash Hoare Logic for Certifying the FSCQ File System", In Proceedings of the 25th Symposium on Operating Systems Principles, Monterey, CA, US, Oct. 4-7, 2015, pp. 1-20.

Chen, X., et al., "Overshadow: A Virtualization-based Approach to Retrofitting Protection in Commodity Operating Systems", In Proc. of the 13th Intl. Conf. on Architectural Support for Programming Languages and Operating Systems, Seattle, WA, US, Mar. 1-5, 2008, pp. 1-12.

Chhabra, S., et al., "SecureME: A Hardware-software Approach to Full System Security", In Proceedings of the 25th International Conference on Supercomputing, Tucson, AZ, US, May 31-Jun. 4, 2011, pp. 1-12.

Cohen, E., et al., "VCC: A Practical System for Verifying Concurrent C", In Proceedings of the International Conference on Theorem Proving in Higher Order Logics, Munich, DE, Aug. 17-20, 2009, pp. 23-42.

Colp, P., et al., "Breaking Up is Hard to Do: Security and Functionality in a Commodity Hypervisor", In Proceedings of the 23rd ACM Symposium on Operating Systems Principles, Cascais, PT, Oct. 23-26, 2011, pp. 1-14.

Corbet, J., "Kaiser: Hiding the Kernel from User Space", LWN.net, Nov. 15, 2017, pp. 1-11, available at: https://lwn.net/Articles/738975/.

Costanzo, D., et al., "End-to-End Verification of Information-Flow Security for C and Assembly Programs", In ACM SIGPLAN Notices, vol. 51, No. 6, Jun. 2016, pp. 648-664.

Criswell, J., et al., "Virtual Ghost: Protecting Applications from Hostile Operating Systems", In Proc. of the 19th Intl. Conf. on Architectural Support for Programming Languages and Operating Systems, Salt Lake City, UT, US, Mar. 1-5, 2014, pp. 1-16.

Dall, C. and Nieh, J., "KVM/ARM: Experiences Building the Linux ARM Hypervisor", Technical Report CUCS-010-13, Columbia University, Apr. 2013, pp. 1-19.

Dall, C. and Nieh, J., "KVM/ARM: The Design and Implementation of the Linux ARM Hypervisor", In Proc. of the 19th Intl. Conf. on Architectural Support for Programming Languages and Operating Systems, Salt Lake City, UT, US, Mar. 1-5, 2014, pp. 1-15.

Dall, C., et al., "ARM Virtualization: Performance and Architectural Implications", In Proceedings of the ACM/IEEE 43rd Annual International Symposium on Computer Architecture (ISCA), Seoul, KR, Jun. 18-22, 2016, pp. 1-13.

Dall, C., et al., "Optimizing the Design and Implementation of the Linux ARM Hypervisor", In Proceedings of the 2017 USENIX Annual Technical Conference (USENIX ATC '17), Santa Clara, CA, US, Jul. 12-14, 2017, pp. 1-15.

Danial, A., "cloc: Count Lines of Code", last updated May 1, 2021, pp. 1-63, available at: https://github.com/AlDanial/cloc.

Dautenhahn, N., et al., "Nested Kernel: An Operating System Architecture for Intra-Kernel Privilege Separation", In Proc. of the 20th Intl. Conf. on Architectural Support for Programming Languages and Operating Systems, Istanbul, TR, Mar. 14-18, 2015, pp. 1-16.

Deng, L., et al., "Dancing with Wolves: Towards Practical Event-driven VMM Monitoring", In Proceedings of the 13th ACM SIGPLAN/SIGOPS International Conference on Virtual Execution Environments, Xi'an, CN, Apr. 8-9, 2017, pp. 83-96.

Dong, X., et al., "Shielding Software From Privileged Side-Channel Attacks", In Proceedings of the 27th USENIX Security Symposium, Baltimore, MD, US, Aug. 15-17, 2018, pp. 1-19.

Ernst, G. and Murray, T., "SecCSL: Security Concurrent Separation Logic", In Proceedings of the International Conference on Computer Aided Verification, New York, NY, US, Jul. 15-18, 2019, pp. 208-230.

Ferraiuolo, A., et al., "Komodo: Using Verification to Disentangle Secure-Enclave Hardware from Software", In Proceedings of the 26th Symposium on Operating Systems Principles, Shanghai, CN, Oct. 28, 2017, pp. 1-19.

Flur, S., et al., "Modelling the ARMv8 Architecture, Operationally: Concurrency and ISA", In Proceedings of the 43rd Annual ACM SIGPLAN-SIGACT Symposium on Principles of Programming Languages, St. Petersburg, FL, US, Jan. 20-22, 2016, pp. 1-14.

Focardi, R. and Gorrieri, R., "The Compositional Security Checker: A Tool for the Verification of Information Flow Security Properties", In IEEE Transactions on Software Engineering, vol. 23, No. 9, Sep. 1997, pp. 837-844.

Garfinkel, T., et al., "Terra: A Virtual Machine-based Platform for Trusted Computing", In Proceedings of the 19th ACM Symposium on Operating Systems Principles, Bolton Landing, NY, US, Oct. 19-22, 2003, pp. 1-14.

GNU, "GNU GRUB Manual", May 10, 2021, pp. 1-116, available at: https://www.gnu.org/software/grub/manual/grub/grub.html.

Goguen, J.A. and Meseguer, J., "Unwinding and Inference Control", In Proceedings of the IEEE Symposium on Security and Privacy, Oakland, CA, US, Apr. 29-May 2, 1984, pp. 1-12.

Google Cloud, "Google Cloud Security and Compliance Whitepaper—How Google Protects Your Data", Technical Report, Google LLC, last accessed Aug. 3, 2021, pp. 1-27.

Google LLC, "HTTPS encryption on the web—Google Transparency Report", last accessed Aug. 3, 2021, pp. 1-9, available at: https://transparencyreport.google.com/https/overview.

Graham-Cumming, J. and Sanders, J.W., "On The Refinement of Non-Interference", In Proceedings of the Computer Security Foundations Workshop IV, Franconia, NH, US, Jun. 18-20, 1991, pp. 1-8.

Gu, R., et al., "Certified Concurrent Abstraction Layers", In Proc. of the 39th ACM SIGPLAN Conf. on Programming Language Design and Implementation, Philadelphia, PA, US, Jun. 18-22, 2018, pp. 1-16.

Gu, R., et al., "CertiKOS: An Extensible Architecture for Building Certified Concurrent OS Kernels", In Proceedings of the 12th USENIX Symposium on Operating Systems Design and Implementation, Savannah, GA, US, Nov. 2-4, 2016, pp. 1-19.

Gu, R., et al., "Deep Specifications and Certified Abstraction Layers", In ACM SIGPLAN Notices, vol. 50, No. 1, Jan. 2015, pp. 595-608.

Hajnoczi, S., "An Updated Overview of the QEMU Storage Stack", Presentation, IBM Linux Technology Center, Jun. 2011, pp. 1-26.

Halderman, J.A., et al., "Lest We Remember: Cold Boot Attacks on Encryption Keys", In Proceedings of the 17th USENIX Security Symposium, San Jose, CA, US, Jul. 28-Aug. 1, 2008, pp. 1-16.

Hawblitzel, C., et al., "Ironclad Apps: End-to-End Security via Automated Full-System Verification", In Proceedings of the 11th USENIX Symposium on Operating Systems Design and Implementation, Broomfield, CO, US, Oct. 6-8, 2014, pp. 1-18.

Hawblitzel, C., et al., "IronFleet: Proving Practical Distributed Systems Correct", In Proceedings of the 25th Symposium on Operating Systems Principles, Monterey, CA, US, Oct. 4-7, 2015, pp. 1-17.

Heiser, G. and Leslie, B., "The OKL4 Microvisor: Convergence Point of Microkernels and Hypervisors", In Proceedings of the 1st ACM Asia-Pacific Workshop on Workshop on Systems, New Delhi, IN, Aug. 30, 2010, pp. 1-5.

Hicks, M., et al., "Overcoming an Untrusted Computing Base: Detecting and Removing Malicious Hardware Automatically", In ;login: Magazine, vol. 35, No. 6, Dec. 2010, pp. 31-41.

Hofmann, O.S., et al., "InkTag: Secure Applications on an Untrusted Operating System", In Proc. of the 18th Intl. Conf. on Architectural Support for Programming Languages and Operating Systems, Houston, TX, US, Mar. 16-20, 2013, pp. 1-37.

Hua, Z., et al., "vTZ: Virtualizing ARM Trustzone", In Proceedings of the 26th USENIX Security Symposium, Vancouver, BC, Canada, Aug. 16-18, 2017, pp. 1-17.

Intel Corporation, "Intel Architecture Memory Encryption Technologies Specification", Technical Report, 336907-001US, Dec. 2017, pp. 1-30.

Intel Corporation, "Intel Software Guard Extensions Programming Reference", Technical Report, 329298-002US, Oct. 2014, pp. 1-186.

(56) References Cited

OTHER PUBLICATIONS

International Organization for Standardization and International Electrotechnical Commission, "Information Technology—Trusted Platform Module Library—Part 1: Architecture", Technical Report, ISO/IEC 11889-1:2015, Apr. 1, 2016, pp. 1-278.
Irazoqui, G., et al., "S$A: A Shared Cache Attack That Works across Cores and Defies VM Sandboxing—and Its Application to AES", In Proceedings of the IEEE Symposium on Security and Privacy, San Jose, CA, US, May 17-21, 2015, pp. 1-14.
Jang, D., et al., "Establishing Browser Security Guarantees through Formal Shim Verification", In Proceedings of the 21st USENIX Security Symposium, Bellevue, WA, US, Aug. 8-10, 2012, pp. 1-16.
Jin, S., et al., "Architectural Support for Secure Virtualization Under a Vulnerable Hypervisor", In Proc. of the 44th Annual IEEE/ACM Intl. Symposium on Microarchitecture, Porto Alegre, BR, Dec. 3-7, 2011, pp. 1-12.
Jones, C.B., "Tentative Steps Toward a Development Method for Interfering Programs", In ACM Transactions on Programming Languages and Systems, vol. 5, No. 4, Oct. 1983, pp. 596-619.
Jones, R., "Netperf", last accessed Jul. 27, 2021, pp. 1-2, available at: https://github.com/HewlettPackard/netperf.
Karbyshev, A., et al., "Compositional Non-Interference for Concurrent Programs via Separation and Framing", In Proc. of the 7th Intl. Conf. on Theory and Practice of Software, Thessaloniki, GR, Apr. 14-20, 2018, pp. 53-78.
Keller, E., et al., "NoHype: Virtualized Cloud Infrastructure Without the Virtualization", In Proceedings of the 37th Annual International Symposium on Computer Architecture, Saint-Malo, FR, Jun. 19-23, 2010, pp. 1-12.
Keller, R.M., "Formal Verification of Parallel Programs", In Communications of the ACM, vol. 19, No. 7, Jul. 1976, pp. 371-384.
Kemerlis, V.P., et al., "kGuard: Lightweight Kernel Protection against Return-to-User Attacks", In Proceedings of the 21st USENIX Security Symposium, Bellevue, WA, US, Aug. 8-10, 2012, pp. 1-16.
Kivity, A., et al., "KVM: The Linux Virtual Machine Monitor", In Proceedings of the Ottawa Linux Symposium, Ottawa, ON, Canada, Jun. 27-30, 2007, pp. 225-230.
Klein, G., et al., "Formally Verified Software in the Real World", In Communications of the ACM, vol. 61, No. 10, Oct. 2018, pp. 68-77.
Klein, G., et al., "seL4: Formal Verification of an OS Kernel", In Proceedings of the 22nd ACM Symposium on Operating Systems Principles, Big Sky, MT, US, Oct. 11-14, 2009, pp. 1-14.
Kokke, "Kokke/Tiny AES in C", last accessed Jul. 27, 2021, pp. 1-4, available at: https://github.com/kokke/tiny-AES-c.
Kuperman, Y., et al., "Paravirtual Remote I/O", In Proc. of the 21st Intl. Conf. on Architectural Support for Programming Languages and Operating Systems, Atlanta, GA, US, Apr. 2-6, 2016, pp. 1-17.
KVM Contributors, "CPU Performance", KVM, last accessed Jul. 27, 2021, pp. 1-2, available at: https://www.linux-kvm.org/page/Tuning_KVM.
KVM Contributors, "Kernel Samepage Merging", KVM, last accessed Jul. 27, 2021, pp. 1-2, available at: https://www.linux-kvm.org/page/KSM.
KVM Contributors, "KVM Unit Tests", KVM, last accessed Jul. 27, 2021, pp. 1-6, available at: https://www.linux-kvm.org/page/KVM-unit-tests.
Lam, L.C. and Chiueh, T.C., "A General Dynamic Information Flow Tracking Framework for Security Applications", In Proceedings of the 22nd Annual Computer Security Applications Conference, Miami Beach, FL, US, Dec. 11-15, 2006, pp. 436-472.
Landau, S., "Making Sense from Snowden: What's Significant in the NSA Surveillance Revelations", In IEEE Security & Privacy, vol. 11, No. 4, Jul.-Aug. 2013, pp. 54-63.
Leinenbach, D. and Santen, T., "Verifying the Microsoft Hyper-V Hypervisor with VCC", In Proceedings of the International Symposium on Formal Methods, Eindhoven, NL, Nov. 2-6, 2009, pp. 806-809.
Leroy, X., "The CompCert C Verified Compiler: Documentation and User's Manual", Technical Report, Version 3.8, College of France and Inria, Nov. 16, 2020, pp. 1-80.
Let's Encrypt, "Let's Encrypt Stats", last accessed Apr. 14, 2018, pp. 1-2, available at: https://web.archive.org/web/20180414152054/https://letsencrypt.org/stats/.
Li, S.W., et al., "Protecting Cloud Virtual Machines from Hypervisor and Host Operating System Exploits", In Proceedings of the 28th USENIX Security Symposium, Santa Clara, CA, US, Aug. 14-16, 2019, pp. 1-19.
Liang, H., et al., "A Rely-Guarantee-Based Simulation for Verifying Concurrent Program Transformations", In Proc. of the 39th Annual ACM SIGPLAN-SIGACT Symposium on Principles of Programming Languages, Philadelphia, PA, US, Jan. 25-27, 2012, pp. 1-14.
Liedtke, J., "On Micro-Kernel Construction", In Proceedings of the 15th ACM Symposium on Operating Systems Principles, Copper Mountain, CO, US, Dec. 3-6, 1995, pp. 1-16.
Lim, J., et al., "NEVE: Nested Virtualization Extensions for ARM", In Proceedings of the 26th Symposium on Operating Systems Principles, Shanghai, CN, Oct. 28, 2017, pp. 1-17.
Liu, F., et al., "Last-Level Cache Side-Channel Attacks are Practical", In Proceedings of the IEEE Symposium on Security and Privacy, San Jose, CA, US, May 17-21, 2015, pp. 1-18.
Liu, Y., et al., "Thwarting Memory Disclosure with Efficient Hypervisor-enforced Intra-domain Isolation", In Proc. of the 22nd ACM SIGSAC Conf. on Computer and Comms. Security, Denver, CO, US, Oct. 12-16, 2015, pp. 1-13.
Lynch, N. and Vaandrager, F., "Forward and Backward Simulations", In Information and Computation, vol. 121, No. 2, Sep. 1995, pp. 214-233.
McCune, J.M., et al., "TrustVisor: Efficient TCB Reduction and Attestation", In Proceedings of the IEEE Symposium on Security and Privacy, Oakland, CA, US, May 16-19, 2010, pp. 1-17.
Microsoft Azure, "Key Vault", last accessed Jul. 27, 2021, pp. 1-7, available at: https://azure.microsoft.com/en-in/services/key-vault/.
Microsoft, "BitLocker", Jan. 26, 2018, pp. 1-6, available at: https://docs.microsoft.com/en-us/windows/security/information-protection/bitlocker/bitlocker-overview.
Microsoft, "Hyper-V Technology Overview", Nov. 29, 2016, pp. 1-5, available at: https://docs.microsoft.com/en-us/windows-server/virtualization/hyper-v/hyper-v-technology-overview.
Mosberger, D., "Memory Consistency Models", In ACM SIGOPS Operating Systems Review, vol. 27, No. 1, Jan. 1993, pp. 18-26.
Murray, D.G., et al., "Improving Xen Security Through Disaggregation", In Proceedings of the 4th ACM SIGPLAN/SIGOPS International Conference on Virtual Execution Environments, Seattle, WA, US, Mar. 5-7, 2008, pp. 1-10.
Murray, T., et al., "Compositional Verification and Refinement of Concurrent Value-Dependent Noninterference", In Proceedings of the IEEE 29th Computer Security Foundations Symposium, Lisbon, PT, Jun. 27-Jul. 1, 2016, pp. 1-15.
Murray, T., et al., "COVERN: A Logic for Compositional Verification of Information Flow Control", In Proceedings of the IEEE European Symposium on Security and Privacy, London, UK, Apr. 24-26, 2018, pp. 1-15.
Murray, T., et al., "Noninterference for Operating System Kernels", In Proceedings of the International Conference on Certified Programs and Proofs, Kyoto, JP, Dec. 13-15, 2012, pp. 1-16.
Murray, T., et al., "seL4: From General Purpose to a Proof of Information Flow Enforcement", In Proceedings of the IEEE Symposium on Security and Privacy, Berkeley, CA, US, May 19-22, 2013, pp. 1-15.
Nelson, L., et al., "Scaling Symbolic Evaluation for Automated Verification of Systems Code with Serval", In Proceedings of the 27th ACM Symposium on Operating Systems Principles, Huntsville, ON, Canada, Oct. 27-30, 2019, pp. 1-18.
Nguyen, A., et al., "Delusional Boot: Securing Hypervisors Without Massive Re-engineering", In Proceedings of the 7th ACM European Conference on Computer Systems, Bern, CH, Apr. 10-13, 2012, pp. 1-14.
Olarte, C. and Valencia, F.D., "Universal Concurrent Constraint Programing: Symbolic Semantics and Applications to Security", In Proceedings of the ACM Symposium on Applied Computing, Fortaleza, Ceara, BR, Mar. 16-20, 2008, pp. 145-150.
OP-TEE, "Open Portable Trusted Execution Environment", last accessed Jul. 27, 2021, pp. 1, available at: https://www.op-tee.org/.

(56) References Cited

OTHER PUBLICATIONS

Owens, S., et al., "A Better x86 Memory Model: x86-TSO", In Proceedings of the 22nd International Conference on Theorem Proving in Higher Order Logics, Munich, DE, Aug. 17-20, 2009, pp. 1-17.

Peters, O., et al., "orlp / Ed25519", last accessed Jul. 27, 2021, pp. 1-5, available at: https://github.com/orlp/ed25519.

Pulte, C., et al., "Promising-ARM/RISC-V: A Simpler and Faster Operational Concurrency Model", In Proceedings of the 40th ACM SIGPLAN Conference on Programming Language Design and Implementation, Phoenix, AZ, US, Jun. 22-26, 2019, pp. 1-25.

Pulte, C., et al., "Simplifying ARM Concurrency: Multicopy-Atomic Axiomatic and Operational Models for ARMv8", In Proceedings of the ACM on Programming Languages, vol. 2, No. POPL, Jan. 2018, pp. 1-29.

Qin, F., et al., "Lift: A Low-Overhead Practical Information Flow Tracking System for Detecting Security Attacks", In Proceedings of the 39th Annual IEEE/ACM International Symposium on Microarchitecture, Orlando, FL, US, Dec. 9-13, 2006, pp. 135-148.

Reuters, "Cloud Companies Consider Intel Rivals After the Discovery of Microchip Security Flaws", CNBC, last updated Jan. 10, 2018, pp. 1-5, available at: https://www.cnbc.com/2018/01/10/cloud-companies-consider-intel-rivals-after-security-flaws-found.html.

Riley, R., et al., "Guest-Transparent Prevention of Kernel Rootkits with VMM-Based Memory Shadowing", In Proc. of the 11th Intl. Symposium on Recent Advances in Intrusion Detection, Cambridge, MA, US, Sep. 15-17, 2008, pp. 1-21.

Ristenpart, T., et al., "Hey, You, Get Off of My Cloud: Exploring Information Leakage in Third-Party Compute Clouds", In Proc. of the 16th ACM Conf. on Computer and Comms. Security, Chicago, IL, US, Nov. 9-13, 2009, pp. 1-14.

Russell, R., "Virtio: Towards a De-Facto Standard for Virtual I/O Devices", In ACM SIGOPS Operating Systems Review, vol. 42, No. 5, Jul. 2008, pp. 95-103.

Russell, R., et al., "Hackbench", Jan. 4, 2008, pp. 1-6, available at: https://people.redhat.com/mingo/cfs-scheduler/tools/hackbench.c.

Sabelfeld, A. and Myers, A.C., "A Model for Delimited Information Release", In Proceedings of the International Symposium on Software Security, Tokyo, JP, Nov. 4-6, 2003, pp. 1-18.

Saltzer, J.H., et al., "End-to-End Arguments in System Design", In ACM Transactions on Computer Systems, vol. 2, No. 4, Nov. 1984, pp. 277-288.

Sanan, D., et al., "CSimpl: A Rely-Guarantee-Based Framework for Verifying Concurrent Programs", In Proceedings of the International Conference on Tools and Algorithms for the Construction and Analysis of Systems, Uppsala, SE, Apr. 24-28, 2017, pp. 481-498.

Schoepe, D., et al., "VERONICA: Expressive and Precise Concurrent Information Flow Security (Extended Version with Technical Appendices)", Technical Report, arXiv:2001.11142, Cornell University, Jan. 30, 2020, pp. 1-18.

Seshadri, A., et al., "SecVisor: A Tiny Hypervisor to Provide Lifetime Kernel Code Integrity for Commodity Oses", In Proceedings of 21st ACM SIGOPS Symposium on Operating Systems Principles, Stevenson, WA, US, Oct. 14-17, 2007, pp. 1-17.

Shi, L., et al., "Deconstructing Xen", In Proceedings of the 24th Annual Network and Distributed System Security Symposium, San Diego, CA, US, Feb. 26-Mar. 1, 2017, pp. 1-15.

Shih, M.W., et al., "S-NFV: Securing NFV States by Using SGX", In Proc. of the ACM Intl. Workshop on Security in Software Defined Networks & Network Function Virtualization, New Orleans, LA, US, Mar. 11, 2016, pp. 1-4.

Shinagawa, T., et al., "BitVisor: A Thin Hypervisor for Enforcing I/O Device Security", In Proceedings of the ACM SIGPLAN/SIGOPS International Conference on Virtual Execution Environments, Washington, DC, US, Mar. 11-13, 2009, pp. 1-12.

Siemens, "Jailhouse", last accessed Jul. 27, 2021, pp. 1-10, available at: https://github.com/siemens/jailhouse.

Sigurbjarnarson, H., et al., "Nickel: A Framework for Design and Verification of Information Flow Control Systems", In Proc. of the 13th USENIX Symposium on Operating Systems Design and Implementation (OSDI '18), Carlsbad, CA, US, Oct. 8-10, 2018, pp. 1-20.

Stefan, D., et al., "Addressing Covert Termination and Timing Channels in Concurrent Information Flow Systems", In ACM SIGPLAN Notices, vol. 47, No. 9, Sep. 2012, pp. 201-214.

Steinberg, U. and Kauer, B., "Nova: A Microhypervisor-based Secure Virtualization Architecture", In Proceedings of the 5th European Conference on Computer Systems, Paris, FR, Apr. 13-16, 2010, pp. 1-14.

Stewin, P. and Bystrov, I., "Understanding DMA Malware", In Proc. of the 9th Intl. Conf. on Detection of Intrusions and Malware, and Vulnerability Assessment, Heraklion, Crete, GR, Jul. 26-27, 2012, pp. 1-21.

Strackx, R. and Piessens, F., "Fides: Selectively Hardening Software Application Components Against Kernel-level or Process-level Malware", In Proc. of the ACM Conf. on Computer and Comms. Security, Raleigh, NC, US, Oct. 16-18, 2012, pp. 1-12.

SUSE, "Performance Implications of Cache Modes", Jul. 30, 2021, pp. 1-5, available at: https://documentation.suse.com/sles/11-SP4/html/SLES-all/cha-qemu-cachemodes.html.

Szefer, J. and Lee, R.B., "Architectural Support for Hypervisor-secure Virtualization", In Proc. of the 17th Intl. Conf. on Architectural Support for Programming Languages and Operating Systems, London, UK, Mar. 3-7, 2012, pp. 1-13.

Ta-Min, R., et al., "Splitting Interfaces: Making Trust Between Applications and Operating Systems Configurable", In Proceedings of the 7th Symposium on Operating Systems Design and Implementation, Seattle, WA, US, Nov. 6-8, 2006, pp. 279-292.

The Apache Software Foundation, "Ab—Apache HTTP Server Benchmarking Tool", last accessed Jul. 28, 2021, pp. 1-4, available at: http://httpd.apache.org/docs/2.4/programs/ab.html.

The Coq Development Team, "The Coq Proof Assistant", last accessed Aug. 2, 2021, pp. 1, available at: https://coq.inria.fr/.

Trippel, C.J., "Concurrency and Security Verification in Heterogeneous Parallel Systems", Technical Report, Princeton University, Nov. 2019, pp. 1-88.

Vasudevan, A., et al., "Design, Implementation and Verification of an extensible and Modular Hypervisor Framework", In Proceedings of the IEEE Symposium on Security and Privacy, Berkeley, CA, US, May 19-22, 2013, pp. 1-15.

Vasudevan, A., et al., "uberSpark: Enforcing Verifiable Object Abstractions for Automated Compositional Security Analysis of a Hypervisor", In Proceedings of the 25th USENIX Security Symposium, Austin, TX, US, Aug. 10-12, 2016, pp. 1-19.

Vaughan-Nichols, S.J., "Hypervisors: The Cloud's Potential Security Achilles Heel", ZDNet, Mar. 29, 2014, pp. 1-16.

Von Tessin, M., "The Clustered Multikernel: An Approach to Formal Verification of Multiprocessor OS Kernels", In Proceedings of the 2nd Workshop on Systems for Future Multi-core Architectures, Bern, CH, Apr. 2012, pp. 1-6.

Waldspurger, C.A., "Memory Resource Management in VMware ESX Server", In Proceedings of the 5th Symposium on Operating Systems Design and Implementation, Boston, MA, US, Dec. 9-11, 2002, pp. 1-15.

Wang, X., et al., "SecPod: A Framework for Virtualization-based Security Systems", In Proceedings of the USENIX Annual Technical Conference (USENIC ATC '15), Santa Clara, CA, US, Jul. 8-10, 2015, pp. 1-15.

Wang, Z. and Jiang, X., "HyperSafe: A Lightweight Approach to Provide Lifetime Hypervisor Control-Flow Integrity", In Proceedings of the IEEE Symposium on Security and Privacy, Oakland, CA, US, May 16-19, 2010, pp. 1-16.

Wang, Z., et al., "Countering Kernel Rootkits with Lightweight Hook Protection", In Proceedings of the 16th ACM Conference on Computer and Communications Security, Chicago, IL, US, Nov. 9-13, 2009, pp. 1-10.

Wang, Z., et al., "Isolating Commodity Hosted Hypervisors with HyperLock", In Proceedings of the 7th ACM European Conference on Computer Systems, Bern, CH, Apr. 10-13, 2012, pp. 1-14.

Williams, C., "Microsoft: Can't Wait for ARM to Power MOST of Our Cloud Data Centers! Take that, Intel! Ha! Ha!", The Register, (56) References Cited

OTHER PUBLICATIONS

Mar. 9, 2017, pp. 1-11, available at: https://www.theregister.com/2017/03/09/microsoft_arm_server_followup/.

Wu, C., et al., "Taming Hosted Hypervisors with (Mostly) Deprivileged Execution", In Proceedings of the 20th Annual Network and Distributed System Security Symposium, San Diego, CA, US, Feb. 24-27, 2013, pp. 1-15.

Wu, Y., et al., "Comprehensive VM Protection Against Untrusted Hypervisor Through Retrofitted AMD Memory Encryption", In Proc. of the IEEE Intl. Symposium on High Performance Computer Architecture, Vienna, AT, Feb. 24-28, 2018, pp. 1-13.

Xia, Y., et al., "Architecture Support for Guest-Transparent VM Protection from Untrusted Hypervisor and Physical Attacks", In Proc. of the IEEE 19th Intl. Symposium on High Performance Computer Architecture, Shenzhen, CN, Feb. 23-27, 2013, pp. 1-12.

Yang, J. and Shin, K.G., "Using Hypervisor to Provide Data Secrecy for User Applications on a Per-page Basis", In Proc. of the 4th ACM SIGPLAN/SIGOPS Intl. Conf. on Virtual Execution Environments, Seattle, WA, US, Mar. 5-7, 2008, pp. 1-10.

Zhang, F., et al., "CloudVisor: Retrofitting Protection of Virtual Machines in Multi-tenant Cloud with Nested Virtualization", In Proceedings of the 23rd ACM Symposium on Operating Systems Principles, Cascais, PT, Oct. 23-26, 2011, pp. 203-216.

Zhang, Y., et al., "Cross-Tenant Side-Channel Attacks in PaaS Clouds", In Proceedings of the ACM SIGSAC Conference on Computer and Communications Security, Scottsdale, AZ, US, Nov. 3-7, 2014, pp. 1-14.

Zhang, Y., et al., "Cross-VM Side Channels and Their Use to Extract Private Keys", In Proceedings of the ACM Conference on Computer and Communications Security, Raleigh, NC, US, Oct. 16-18, 2012, pp. 1-12.

Zhou, Z., et al., "Dancing with Giants: Wimpy Kernels for On-Demand Isolated I/O", In Proceedings of the IEEE Symposium on Security and Privacy, Berkeley, CA, US, May 18-21, 2014, pp. 1-16.

Zhu, M., et al., "HA-VMSI: A Lightweight Virtual Machine Isolation Approach with Commodity Hardware for ARM", In Proc. of the 13th ACM SIGPLAN/SIGOPS Intl. Conf. on Virtual Execution Environments, Xi'an, CN, Apr. 8-9, 2017, pp. 1-15.

Zinzindohoue, J.K., et al., "HACL: A Verified Modern Cryptographic Library", In Proc. of the ACM SIGSAC Conf. on Computer and Comms. Security, Dallas, TX, US, Oct. 30-Nov. 3, 2017, pp. 1-18.

Zou, M., et al., "Using Concurrent Relational Logic with Helpers for Verifying the AtomFS File System", In Proceedings of the 27th ACM Symposium on Operating Systems Principles, Huntsville, ON, Canada, Oct. 27-30, 2019, pp. 1-16.

7-CPU.com, "Applied Micro X-gene", 7-CPU.com, last accessed Jan. 31, 2024, pp. 1-2, available at: https://www.7-cpu.com/cpu/X-Gene.html.

Alglave, J., et al., "Frightening Small Children and Disconcerting Grown-ups: Concurrency in the Linux Kernel", In Proceedings of the Twenty-Third International Conference on Architectural Support for Programming Languages and Operating Systems, Williamsburg, VA, US, Mar. 24-28, 2018, pp. 1-14.

Alglave, J., et al., "Herding Cats: Modelling, Simulation, Testing, and Data Mining for Weak Memory", In ACM Transactions on Programming Languages and Systems (TOPLAS), vol. 36, No. 2, Jul. 1, 2014, pp. 1-74.

Alglave, J., et al., "The Semantics of Power and ARM Multiprocessor Machine Code", In Proceedings of the 4th Workshop on Declarative Aspects of Multicore Programming, Savannah, GA, US, Jan. 20, 2009, pp. 1-12.

Asanovic, K., et al., "The RISC-V Instruction Set Manual, vol. I: User-level ISA, Document Version 20191213", RISC-V Foundation, Dec. 2019, pp. 1-238.

Batty, M., et al., "Mathematizing C++ Concurrency", In Proceedings of the 38th Annual Acm Sigplan-Sigact Symposium on Principles of Programming Languages, Austin, TX, US, Jan. 26-28, 2011, pp. 1-12.

Blazy, S., et al., "Mechanized Semantics for the Clight Subset of the C Language", In Journal of Automated Reasoning, vol. 43, No. 3, Jul. 24, 2009, pp. 1-26.

Boudol, G., et al., "Relaxed Memory Models: an Operational Approach", In ACM Sigplan Notices, vol. 44, No. 1, Jan. 21, 2009, pp. 1-12.

Cooper, B. F., et al., "Benchmarking Cloud Serving Systems with YCSB", In Proceedings of the 1st ACM Symposium on Cloud Computing, Indianapolis, IN, US, Jun. 10-11, 2010, pp. 143-154.

Deacon, W., et al., "The Armv8 Application Level Memory Model", Arm Ltd., Jan. 2016, pp. 1-2, available at: http://diy.inria.fr/www/?record=aarch64.

Dolan, S., et al., "Bounding Data Races in Space and Time", In Proceedings of the 39th ACM Sigplan Conference on Programming Language Design and Implementation, Philadelphia, PA, US, Jun. 18-22, 2018, pp. 1-19.

Donenfeld, J. A., "Wireguard: Next Generation Kernel Network Tunnel", In Proceedings of the 24th Annual Network and Distributed System Security Symposium, San Diego, CA, US, Feb. 26-Mar. 1, 2017, pp. 1-12.

Gray, K. E., et al., "An Integrated Concurrency and Core-ISA Architectural Envelope Definition, and Test Oracle, for IBM Power Multiprocessors", In Proceedings of the 48th International Symposium on MicroArchitecture, Waikiki, HI, Dec. 5-9, 2015, pp. 635-646.

Hajdarbegovic, N., "Arm Servers: Mobile CPU Architecture For Datacentres?", Toptal, last accessed Aug. 19, 2021, pp. 1-23, available at: https://www.toptal.com/back-end/arm-servers-armv8-for-datacentres.

Jiang, H., et al., "Towards Certified Separate Compilation for Concurrent Programs", In Proceedings of the 40th Acm Sigplan Conference on Programming Language Design and Implementation, Phoenix, AZ, US, Jun. 22-26, 2019, pp. 111-125.

Kang, J., et al., "A Promising Semantics for Relaxed Memory Concurrency", In Proceedings of the 44th ACM Sigplan Symposium on Principles of Programming Languages, Paris, FR, Jan. 18-20, 2017, pp. 175-189.

Klein, G., et al., "Comprehensive Formal Verification of an OS Microkernel", In ACM Transactions on Computer Systems (TOCS), vol. 32, No. 1, Feb. 26, 2014, pp. 1-70.

KVM Contributors, "Tuning KVM", KVM, last accessed Jan. 31, 2024, pp. 1-2, available at: https://www.linux-kvm.org/page/Tuning_KVM.

Lahav, O., et al., "Decidable Verification Under a Causally Consistent Shared Memory" In Proceedings of the 41st ACM Sigplan Conference on Programming Language Design and Implementation, London, UK, Jun. 15-20, 2020, pp. 211-226.

Lahav, O., et al., "Repairing Sequential Consistency in C/C++11", In Proceedings of the 38th ACM Sigplan Conference on Programming Language Design and Implementation, Barcelona, ES, Jun. 18-23, 2017, pp. 618-632.

Lamport, L., "How to Make a Multiprocessor Computer That Correctly Executes Multiprocess Programs", In IEEE Transactions on Computers, vol. C-28, No. 9, Sep. 1979, pp. 690-691.

Li, S.W., et al., "A Secure and Formally Verified Linux KVM Hypervisor", In Proceedings of the 2021 IEEE Symposium on Security and Privacy (SP), San Francisco, CA, US, May 24-27, 2021, pp. 1782-1799.

Liu, F., et al., "Dynamic Synthesis for Relaxed Memory Models", In ACM Sigplan Notices, vol. 47, No. 6, Jun. 11, 2012, pp. 429-439.

Lorch, J. R., et al., "Armada: Low-Effort Verification of High-Performance Concurrent Programs", In Proceedings of the 41st ACM Sigplan Conference on Programming Language Design and Implementation, London, UK, Jun. 15-20, 2020, pp. 197-210.

Mador-Haim, S., et al., "An Axiomatic Memory Model for Power Multiprocessors", In Proceedings of Computer Aided Verification: 24th International Conference, CAV, Berkeley, CA, USA, Jul. 7-13, 2012, pp. 495-512.

Margalit, R., et al., "Verifying Observational Robustness Against a c11-style Memory Model", In Proceedings of the ACM on Programming Languages, vol. 5, No. POPL, Jan. 2021, pp. 1-33.

Office Action dated Jan. 25, 2023 in U.S. Appl. No. 16/916,051, pp. 1-24.

(56) References Cited

OTHER PUBLICATIONS

Office Action dated Mar. 15, 2024 in U.S. Appl. No. 16/916,051, pp. 1-17.
Office Action dated Jun. 14, 2022 in U.S. Appl. No. 16/916,051, pp. 1-36.
Office Action dated Aug. 7, 2023 in U.S. Appl. No. 16/916,051, pp. 1-26.
Office Action dated Dec. 4, 2023 in U.S. Appl. No. 16/916,051, pp. 1-27.
Podkopaev, A., et al., "Bridging the Gap Between Programming Languages and Hardware Weak Memory Models", In Proceedings of the ACM on Programming Languages, vol. 3, No. 69, POPL, Jan. 2019, pp. 1-31.
Sarkar, S., et al., "Synchronising c/c++ and Power", In Proceedings of the 33rd ACM Sigplan Conference on Programming Language Design and Implementation, Beijing, CN, Jun. 11-16, 2012, pp. 311-322.
Sarkar, S., et al., "Understanding Power Multiprocessors", ACM Sigplan Notices, vol. 46, No. 6, Jun. 2011, pp. 175-186.
evcík, J., et al., "CompCertTSO: A Verified Compiler for Relaxed-Memory Concurrency", In Journal of the ACM, vol. 60, No. 3, Jun. 1, 2013, pp. 1-49.
Sewell P., et al., "x86-TSO: A Rigorous and Usable Programmer's Model for x86 Multiprocessors", In Communications of the ACM, vol. 53, No. 7, Jul. 2010, pp. 89-97.
Sigurbjarnarson, H., et al., "Push-Button Verification of File Systems via Crash Refinement", In Proceedings of the 12th Usenix Symposium on Operating Systems Design and Implementation, Savannah, GA, US, Nov. 2-4, 2016, pp. 1-17.
Trusted Computing Group, "Trusted Platform Module", last accessed Jan. 31, 2024, pp. 1-2, available at https://www.trustedcomputinggroup.org/.
United States Provisional U.S. Appl. No. 62/867,808, filed Jun. 27, 2019, pp. 1-20.
United States Provisional U.S. Appl. No. 63/051,710, filed Jul. 14, 2020, pp. 1-29.
United States Provisional U.S. Appl. No. 63/190,674, filed May 19, 2021, pp. 1-17.
Wagner, I. and Bertacco, V., "MCjammer: Adaptive Verification for Multi-core Designs", In Proceedings of the Conference on Design, Automation and Test in Europe, Munich, DE, Mar. 10-14, 2008, pp. 1-6.
Zdancewic, S., et al., "Observational Determinism for Concurrent Program Security", In Proceedings of the 16th IEEE Computer Security Foundations Workshop, Pacific Grove, CA, USA, Jun. 2003, pp. 29-43.

\* cited by examiner

```
1 void acquire (){
2   my_ticket = fetch_and_inc ( ticket ); // with barrier
3   do {
4     reg = now ; // with barrier
5   } while ( reg != my_ticket ); // with barrier
6   pull ( shared_mem );
7 }
8 void release (){
9   push ( shared_mem );
10  now ++; // with barrier
11 }
```

FIG. 3

```
1  void encrypt_page (u32 vmid, u64 buf, u64 out_buf)
2  {
3    phys_addr_t hpa = (phys_addr_t) buf;
4    u64 tmp_pa;
5    u64 pfn = (u64) buf >> PAGE_SHIFT;
6    u64 pfn_out = (u64) out_buf >> PAGE_SHIFT;
7    acquire_lock ();
8    if (get_pfn_owner (pfn) == vmid && get_pfn_owner (pfn_out) == HOSTVISOR)
9    {
10     tmp_pa = get_tmp_buf ();
11     encrypt_buf (vmid, (u64) __el2_va (hpa), (u64) tmp_pa, PAGE_SIZE);
12     el2_memcpy (__el2_va (out_buf), (void *) tmp_pa, PAGE_SIZE);
13   }
14   release_lock ();
15 }
```

SYSTEMS, METHODS, AND MEDIA FOR PROVING THE CORRECTNESS OF SOFTWARE ON RELAXED MEMORY HARDWARE

CROSS-REFERENCE TO RELATED APPLICATIONS

This application claims the benefit of U.S. Provisional Patent Application No. 63/051,710, filed Jul. 14, 2020, and U.S. Provisional Patent Application No. 63/190,674, filed May 19, 2021, each of which is hereby incorporated by reference herein in its entirety.

STATEMENT REGARDING FEDERALLY SPONSORED RESEARCH OR DEVELOPMENT

This invention was made with government support under grant nos. 2052947, 1918400, and 2124080 awarded by the National Science Foundation and grant no. N6600121C4018 awarded by DARPA. The government has certain rights in the invention.

BACKGROUND

As advanced RISC (reduced instruction set computer) machine (Arm) servers are increasingly used by cloud providers, the complexity of their system software, such as operating systems and hypervisors, poses a growing security risk, as large codebases contain many vulnerabilities.

To alleviate memory access bottlenecks, modern instruction set architectures such as Arm, RISC-V, and x86 support relaxed memory hardware, allowing CPUs to reorder memory accesses and execute out of program order. CPUs may observe relaxed memory effects and disagree about the order they observe each other accessing memory.

While formal verification offers a potential solution for secure concurrent system software, existing approaches have not been able to prove the correctness of systems software on Arm relaxed memory hardware.

Accordingly, new mechanisms (including systems, methods, and media for proving the correctness of software on relaxed memory hardware are desirable.

SUMMARY

In accordance with some embodiments, new mechanisms (including systems, methods, and media) for proving the correctness of software on relaxed memory hardware are provided.

In some embodiments, methods for proving the correctness of software on relaxed memory hardware are provided, the methods comprising: receiving a specification, a hardware model, and an implementation for the software to be executed on the relaxed memory hardware; evaluating the software using a sequentially consistent hardware model; evaluating the software using a relaxed memory hardware model and at least one of the following conditions: a data-race-free (DRF)-kernel condition; a no-barrier-misuse condition; a memory-isolation condition; a transactional-page-table condition; a write-once-kernel-mapping condition; and a weak-memory-isolation condition; and outputting an indication of whether the software is correct based on the evaluating the software using the sequentially consistent hardware model and the evaluating the software using the relaxed memory hardware model. In some of these embodiments, the evaluating the software using a relaxed memory hardware model using the data-race-free (DRF)-kernel condition. In some of these embodiments, the evaluating the software using a relaxed memory hardware model using the no-barrier-misuse condition. In some of these embodiments, the evaluating the software using a relaxed memory hardware model using the memory-isolation condition. In some of these embodiments, the evaluating the software using a relaxed memory hardware model using the transactional-page-table condition. In some of these embodiments, the evaluating the software using a relaxed memory hardware model using the write-once-kernel-mapping condition. In some of these embodiments, the evaluating the software using a relaxed memory hardware model using the weak-memory-isolation condition.

In some embodiments, systems for proving the correctness of software on relaxed memory hardware are provided, the systems comprising: a memory; and a hardware processor coupled to the memory and configured to: receive a specification, a hardware model, and an implementation for the software to be executed on the relaxed memory hardware; evaluate the software using a sequentially consistent hardware model; evaluate the software using a relaxed memory hardware model and at least one of the following conditions: a data-race-free (DRF)-kernel condition; a no-barrier-misuse condition; a memory-isolation condition; a transactional-page-table condition; a write-once-kernel-mapping condition; and a weak-memory-isolation condition; and output an indication of whether the software is correct based on the evaluating the software using the sequentially consistent hardware model and the evaluating the software using the relaxed memory hardware model. In some of these embodiments, the evaluating the software using a relaxed memory hardware model using the data-race-free (DRF)-kernel condition. In some of these embodiments, the evaluating the software using a relaxed memory hardware model using the no-barrier-misuse condition. In some of these embodiments, the evaluating the software using a relaxed memory hardware model using the memory-isolation condition. In some of these embodiments, the evaluating the software using a relaxed memory hardware model using the transactional-page-table condition. In some of these embodiments, the evaluating the software using a relaxed memory hardware model using the write-once-kernel-mapping condition. In some of these embodiments, the evaluating the software using a relaxed memory hardware model using the weak-memory-isolation condition.

In some embodiments, non-transitory computer-readable media containing computer executable instructions that, when executed by a first collection of at least one hardware processor, cause the first collection of at least one processor to perform a method for proving the correctness of software on relaxed memory hardware are provided, the method comprising: receiving a specification, a hardware model, and an implementation for the software to be executed on the relaxed memory hardware; evaluating the software using a sequentially consistent hardware model; evaluating the software using a relaxed memory hardware model and at least one of the following conditions: a data-race-free (DRF)-kernel condition; a no-barrier-misuse condition; a memory-isolation condition; a transactional-page-table condition; a write-once-kernel-mapping condition; and a weak-memory-isolation condition; and outputting an indication of whether the software is correct based on the evaluating the software using the sequentially consistent hardware model and the evaluating the software using the relaxed memory hardware model. In some of these embodiments, the evaluating the software using a relaxed memory hardware model using the data-race-free (DRF)-kernel condition. In some of these embodiments, the evaluating the software using a relaxed memory hardware model using the no-barrier-misuse condition. In some of these embodiments, the evaluating the software using a relaxed memory hardware model using the memory-isolation condition. In some of these embodiments, the evaluating the software using a relaxed memory hardware model using the transactional-page-table condition. In some of these embodiments, the evaluating the software using a relaxed memory hardware model using the write-once-kernel-mapping condition.

DETAILED DESCRIPTION

In accordance with some embodiments, new mechanisms (including systems, methods, and media) for proving the correctness of software on relaxed memory hardware are provided.

In some embodiments, these mechanisms can be used to verify kernel-level system software which satisfies a set of synchronization and memory access properties such that these programs can be verified on a sequentially consistent (SC) hardware model and the proofs will automatically hold on Arm relaxed memory hardware.

In some embodiments, these mechanisms can be used to verify concurrent kernel code that is not data race free.

Figure 1:
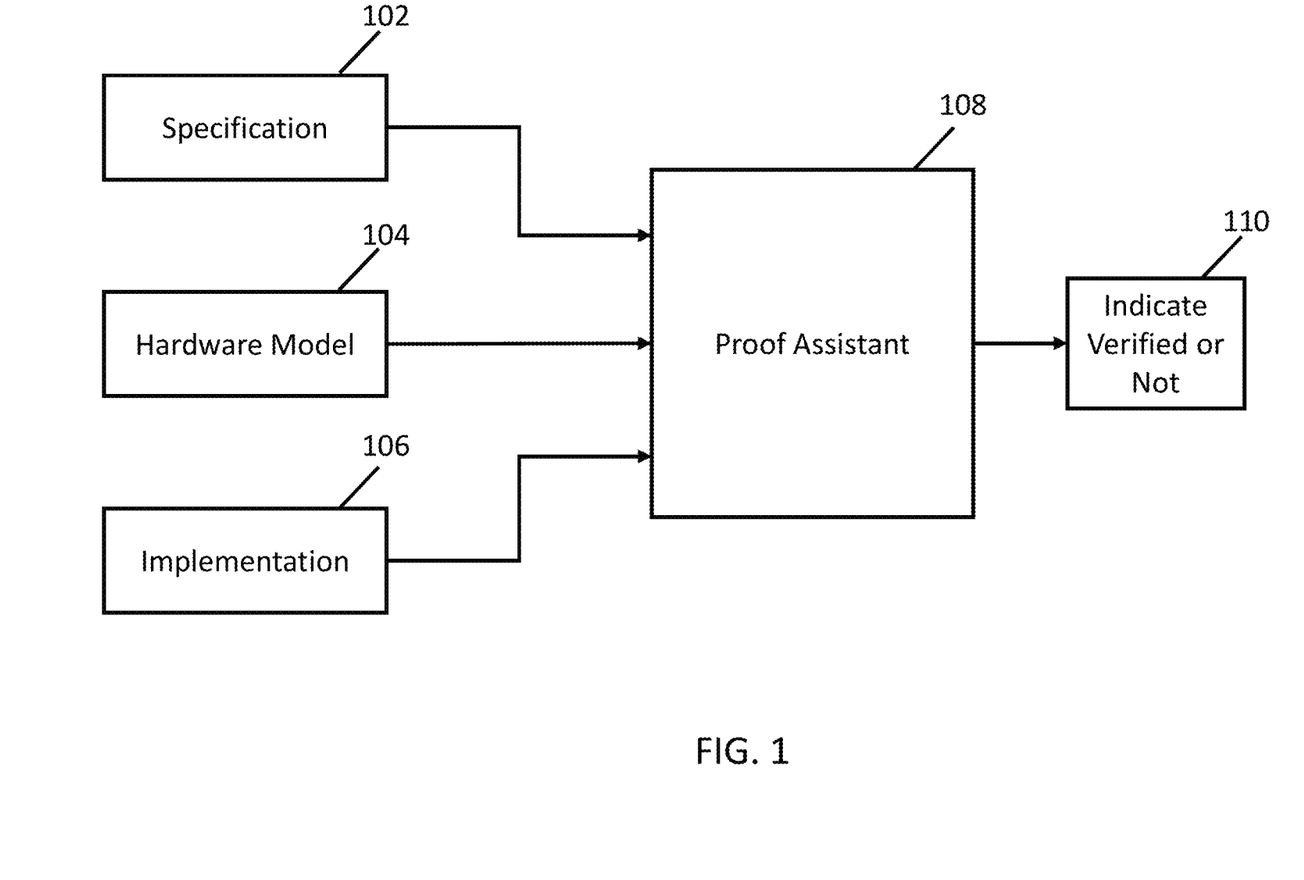
FIG. 1 is an example of block diagram for proving the correctness of software on relaxed memory hardware in accordance with some embodiments.

In accordance with some embodiments, as shown in FIG. 1, the mechanisms described herein can use three components to prove the correctness of software:
(1) a specification 102—an abstract model of how software is meant to behave, which serves as a standard of correctness;
(2) a hardware model 104—an abstract model of the hardware the software executes upon, defining the machine interface with which the software may interact; and
(3) an implementation 106—a program definition representing the software that one is hoping to verify.

In some embodiments, to prove the correctness of software, the mechanisms can show that any behavior exhibited by the implementation running on the hardware model is captured by the specification.

In some embodiments, specification 102, hardware model 104, and implementation 106 can be provided to a proof assistant 108, which can then process the specification, the hardware model, and the implementation to determine whether the software is verified or not (or correct or not) at 110.

Any suitable proof assistant can be used as proof assistant 108 in some embodiments. For example, in some embodiments, the proof assistant can be Coq (which is described at and available from the following web site: coq.inria.fr, which is hereby incorporated by reference herein in its entirety).

The specification, the hardware model, and the implementation can be written in any suitable language compatible with the proof assistant in some embodiments. For example, in some embodiments, the specification, the hardware model, and the implementation can be written in the Coq language.

In accordance with some embodiments, the mechanisms described herein can define a set of synchronization and memory access conditions, which may be referred to herein as weak data race free (wDRF) conditions, that need to met on relaxed memory hardware in order for software to be proven correct (i.e., verified).

In some embodiments, kernel code which satisfies these conditions can be verified on an SC hardware model and have the proofs hold when running on Arm relaxed memory hardware.

wDRF conditions can be thought of as a weaker notion of data race free conditions, which require that all writes to shared objects are well protected by synchronization primitives, but reads may occur at any time. wDRF is important in practice because kernel code is often not strictly data race free because it is responsible for managing page tables, which may be shared across multiple central processing units (CPUs) on multiprocessor hardware and concurrently read via memory management unit (MMU) hardware while they are being updated by kernel code.

In accordance with some embodiments, a multi-layer hardware model can be provided so that software properties that must be proven in the presence of relaxed memory behavior can be verified on a relaxed memory hardware model, which can then be lifted to an SC hardware model to simplify the rest of the program verification.

In some embodiments, the mechanisms described herein can use a relaxed memory operational model based on Promising Arm (which is described in Pulte et al., "Promising-ARM/RISC-v: a simplete and faster operational concurrency model," PLDI 2019: Proceedings of the 40th ACM SIGPLAN Conference on Programming Language Design and Implementation, Jun. 22-26, 2019, which is hereby incorporated by reference herein in its entirety). Promising Arm has been previously shown to be equivalent to Arm's Armv8 axiomatic models in Coq.

In some embodiments, the model used by mechanisms described herein can be the same as Promising Arm except that it removes some memory ordering constraints imposed by Promising Arm to match the memory behavior of Arm's axiomatic model. In some embodiments, this makes it a simpler model to use to verify real software. For kernel code which satisfies the wDRF conditions, properties of the kernel code verified on an SC model hold on a relaxed memory model in some embodiments. In some embodiments, the set of possible software behaviors on the relaxed memory model can be a superset of those on Promising Arm, given the latter's more restrictive memory ordering constraints. As a result, for kernel code satisfying wDRF conditions, the properties of the kernel code verified on an SC model can also hold on Promising Arm, and therefore on Arm relaxed memory hardware, in some embodiments.

In some of these embodiments, the mechanisms can require that the kernel runs directly on physical memory, or on virtual memory with a trivial page table.

In some embodiments, the kernel code may run along with arbitrary user or guest code (collectively referred to as user code below). The possible observable behaviors of user code are: the execution result of a system call which runs a piece of the kernel code; and the result of a memory read issued via MMU when running the user code. In accordance with some embodiments, the mechanisms described herein extend the proof of correctness and security based on this set of observable behavior in an SC model proof to a relaxed memory model because the set of observable behavior on the relaxed memory model is a subset of that on the SC model.

In accordance with some embodiments, the wDRF conditions can include any one or more (or all) of the following:
- a DRF-kernel condition: requires that shared memory accesses in the kernel are well synchronized except for the implementation of synchronization methods and page table accesses.
- a no-barrier-misuse condition: requires that barriers are correctly placed in the kernel to guard critical sections and synchronization methods.
- a memory-isolation condition: requires that the memory space accessible by the kernel should be partially isolated from user code, i.e., user code cannot write kernel memory and kernel code cannot read user memory.
- a transactional-page-table condition: requires that shared page table writes within a critical section are transactional. A series of shared page table writes is called transactional if, under arbitrary reordering of these writes, any page table walk can only see (1) the walking result before all page table writes, (2) the walking result after all page table writes occur in the program order, or (3) a page fault.
- a write-once-kernel-mapping condition: requires that the kernel's own shared page tables can only be written once—only empty page table entries of the kernel can be modified.
- a weak-memory-isolation condition: requires that the memory space accessible by the kernel code is partially isolated with user programs: (1) a user program cannot modify kernel's memory and (2) kernel code can read the memory of the user program Q, as long as there exists one user program Q' that can produce the same memory contents over an SC model.

In some embodiments, to prove software (e.g., a kernel) correct on Arm hardware, the mechanisms described herein can prove 1) the software is correct on SC model and 2) the software satisfies the wDRF conditions.

Figure 2:
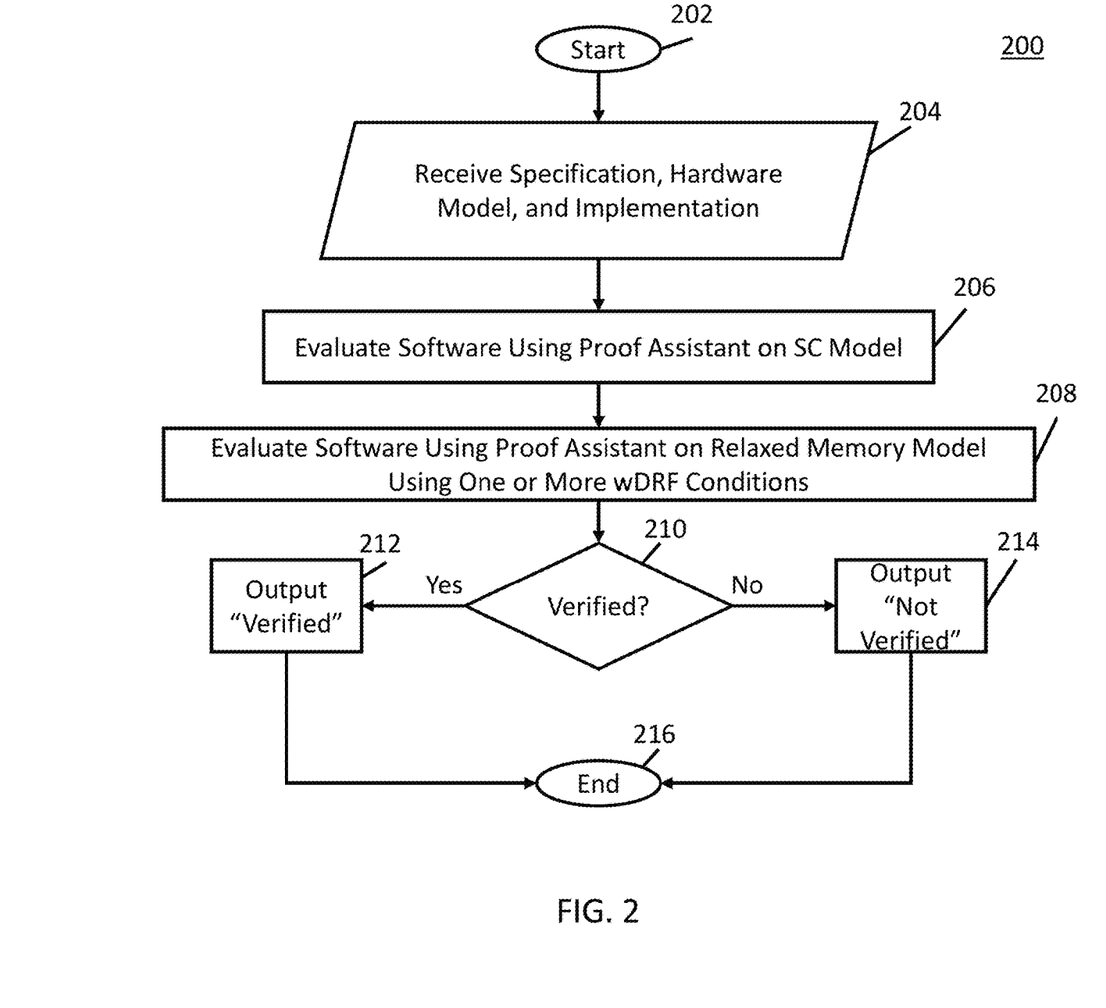
FIG. 2 is an example of a flow diagram for proving the correctness of software on relaxed memory hardware in accordance with some embodiments.

For example, as shown in FIG. 2, a process 200 can be used to verify software in some embodiments. As shown, after beginning at 202, process 200 can receive a specification, a hardware model, and an implementation (as those terms are described above) at 204. The specification, the hardware model, and the implementation can be received in any suitable manner (e.g., as a set of files), in any suitable language (e.g., in the Coq language), from any suitable source.

Next, at 206, the software can be evaluated by a proof assistant using an SC model. Any suitable proof assistant (e.g., Coq) can be used in some embodiments.

Then, at 208, the software can be evaluated by a proof assistant using a relaxed memory model using one or more of the wDRF conditions described herein. Any suitable proof assistant (e.g., Coq) can be used in some embodiments, and the proof assistant can be the same of different from the proof assistant used in 206.

In some embodiments, the order of 206 and 208 can be reversed or 206 and 208 can be performed at the same time. In some embodiments, the performance of one of 206 and 208 (whichever is latter to be performed) can be omitted when the verification of the other of 206 and 208 fails.

Next, at 210, process 200 can determine if the software is verified. This can be determined in any suitable manner based on the evaluation(s) made at 206 and/or 208 in some embodiments.

If it is determined that the output is verified, process 200 can produce any suitable output indicating same at 212. For example, in some embodiments, process 200 can output an indicator that will allow the software to be executed on any suitable device. As another example, in some embodiments, the output can be indicated to a user, such as an engineer, programmer, or cyber security operator.

If it is determined that the output is not verified, process 200 can produce any suitable output indicating same at 214. For example, in some embodiments, process 200 can output an indicator that will prevent the software from being executed on any suitable device. As another example, in some embodiments, the output can be indicated to a user, such as an engineer, programmer, or cyber security operator.

Once either of 212 and 214 have been performed, process 200 can end at 216.

Further details on the wDRF conditions is now provided.

In accordance with some embodiments, the DRF-kernel condition can be required to avoid data races in concurrent systems.

In accordance with some embodiments, the no-barrier-misuse condition can be required to ensure that critical sections of the software cannot be reordered with lock implementations.

In accordance with some embodiments, the memory-isolation condition can be required to forbid information flow from user code to kernel. The intuition is that the user code may contain poorly synchronized code with data races, and information flow from the user code to the kernel may introduce racy consequences into the kernel.

In accordance with some embodiment, the transactional-page-table condition can be required to prevent the reordering of page table writes from introducing security risks. The basic observation behind transactional-page-table condition is that page table access may be impossible to be data race free because of the MMU hardware, so to ensure the system has the same behaviors on relaxed and SC models, some strong requirements must be enforced.

In some embodiments, to verify that one or more memory sections synchronized by locks satisfy the DRF-kernel condition and the no-barrier-misuse condition, the mechanisms described herein can establish that 1) a ticket lock implementation used to protect the memory section(s) is correct; and 2) the lock(s) is(are) used in a correct way such that no data races exist.

Figure 3:
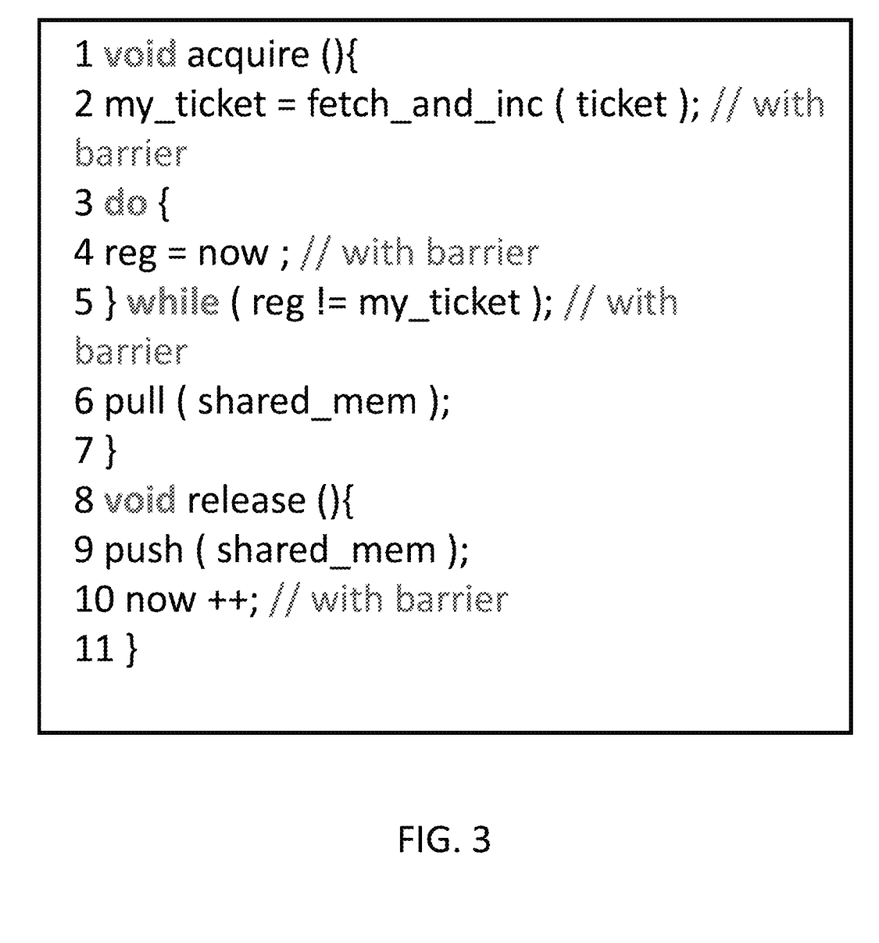
FIG. 3 is an example of a ticket lock mechanism in accordance with some embodiments.

Turning to FIG. 3, an example of a ticket lock mechanism is illustrated. Note that the ticket lock implementation example contains data races—the shared variables "ticket" and "now" can be accessed by multiple threads simultaneously. In this figure, it can be seen that all instructions are guarded with barriers (the subtlety of different types of barriers is omitted here for clarity), so there is no possible reordering of any instructions. Then, following the in-order execution of "acquire" and "release," the mechanism described herein prove that: 1) only the thread whose ticket is equal to now can hold the lock; and 2) each thread has a unique ticket number due to atomicity of fetch_and_inc. Jointly they guarantee mutual exclusion.

After the ticket lock has been determined to have been implemented correctly, in some embodiments, the mechanisms can prove that throughout the kernel, locks are used correctly to protect shared memory access, so there will be no data races. More particularly, in some embodiments, the mechanisms can prove that in a kernel, for every shared resource R, 1) when a thread accesses R, it must have ownership over R (via a pull(R) before), 2) no thread ever pulls R when R is not free, and 3) no thread ever pushes R without ownership over R.

In some embodiments, for the no-barrier misuse condition, it can be seen in FIG. 3, that both "push" and "pull" can be accompanied with barriers. Thus, as shown, the critical sections protected by the lock are bounded with barriers and satisfy the no-barrier-misuse condition.

In some embodiments, the mechanism described herein can determine that kernel memory and user memory are strictly isolated, that user code does not access kernel memory, and that the kernel does not access user memory (or any access is minimized).

Figure 4:
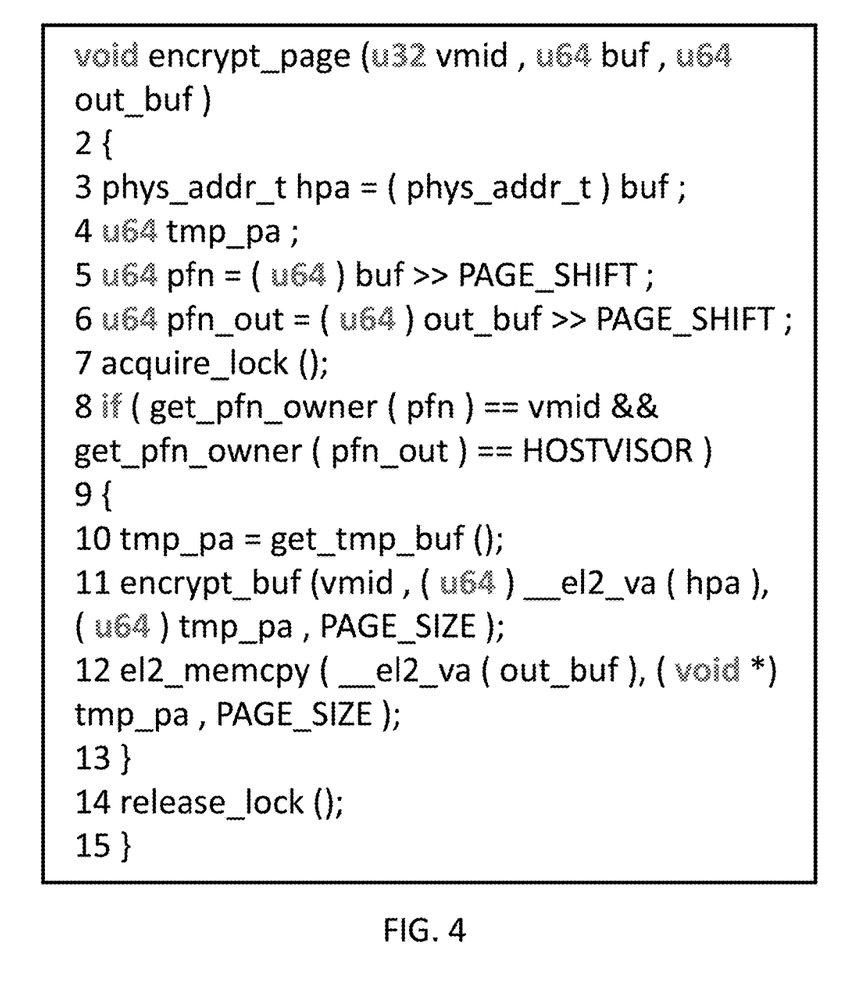
FIG. 4 is an example of code in which a prohibited access is made.

To the extent prohibited access is made (e.g., when kernel code reads user memory as shown in FIG. 4 in which the encrypt_buf( ) procedure will read the value of a page pf a virtual machine), a data oracle (e.g., which reads an arbitrary value to the target register) and the weak memory isolation condition can be used.

In some embodiments, the mechanisms described herein can determine that all page table updates within one or more memory sections are transactional. In some embodiments, the mechanisms can determine that a page table update is transactional when (1) if it sets the mapping in an existing table, only one page table write is required; and (2) if it sets the mapping in a newly inserted table, the write sequence must be inserting 1 n new tables followed by setting a pte in the last inserted table. In some embodiments, the mechanisms can verify that the the changes are visable only when all the n+1 writes to the page table take effect, i.e., without any write, the changes to the page table are not visible given any reordering. First, without updating the pte at the leaf table, all table insertion are not visible because the newly inserted table are full 0. Second, without any table insertion, all the following insertion to that table is invisable including the pte update. Therefore, both set_s2pt and clear_s2pt satisfies transactional page table condition which implies the software satisfying this condition.

The processes and techniques described herein can be implemented using any suitable hardware in some embodiments. For example, in some embodiments, proof assistant 108 and/or process 200 of FIG. 2 can be implemented using any suitable general-purpose computer or special-purpose computer(s). Any such general-purpose computer or special-purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Figure 5:
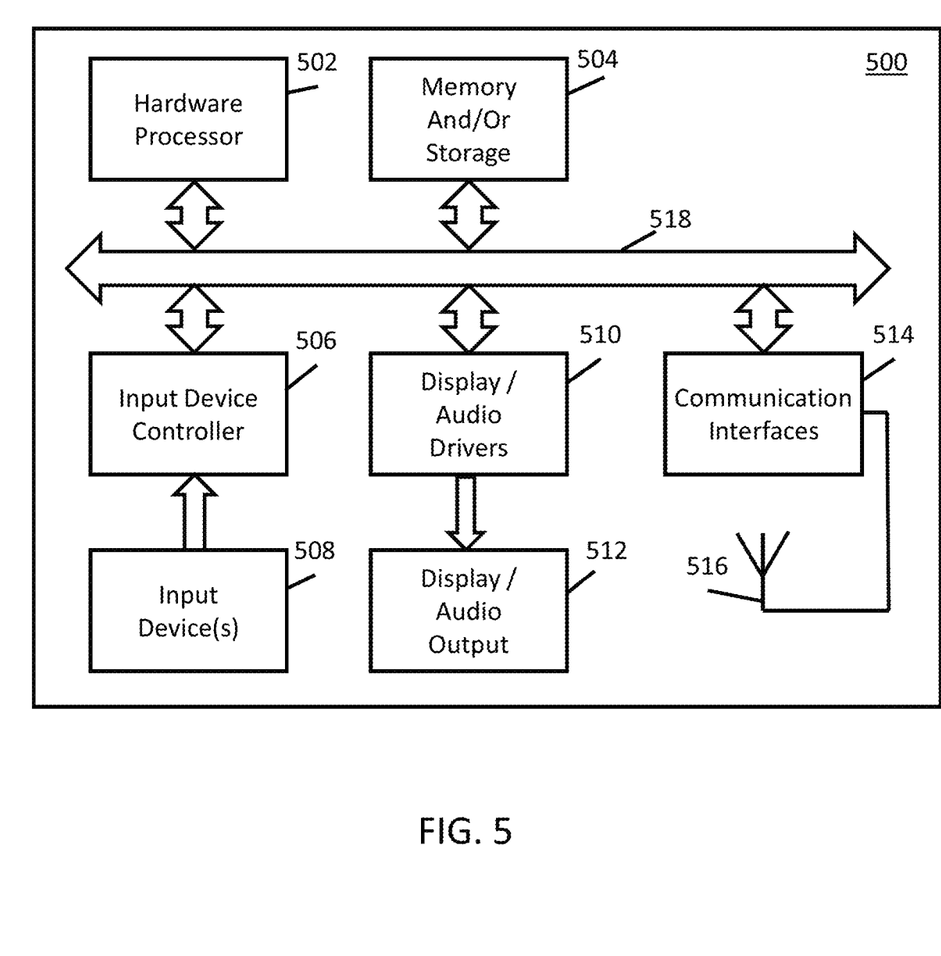
FIG. 5 is an example of hardware that can be used in accordance with some embodiments.

Hardware processor 502 can include any suitable hardware processor, such as a microprocessor, a micro-controller, digital signal processor(s), dedicated logic, and/or any other suitable circuitry for controlling the functioning of a general-purpose computer or a special purpose computer in some embodiments.

Memory and/or storage 504 can be any suitable memory and/or storage for storing programs, data, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from input device(s) 508, such as a game controller, in some embodiments. For example, input device controller 506 can be circuitry for receiving input from an input device 508, such as a touch screen, from one or more buttons, from a voice recognition circuit, from a microphone, from a camera, from an optical sensor, from an accelerometer, from a temperature sensor, from a near field sensor, and/or any other type of input device.

Display/audio drivers 510 can be any suitable circuitry for controlling and driving output to one or more display/audio output circuitries 512 in some embodiments. For example, display/audio drivers 510 can be circuitry for driving one or more display/audio output circuitries 512, such as an LCD display, a speaker, an LED, or any other type of output device.

Communication interface(s) 514 can be any suitable circuitry for interfacing with one or more communication networks. For example, interface(s) 514 can include network interface card circuitry, wireless communication circuitry, and/or any other suitable type of communication network circuitry.

Antenna 516 can be any suitable one or more antennas for wirelessly communicating with a communication network in some embodiments. In some embodiments, antenna 516 can be omitted when not needed.

Bus 518 can be any suitable mechanism for communicating between two or more components 502, 504, 506, 510, and 514 in some embodiments.

Any other suitable components can additionally or alternatively be included in hardware 200 in accordance with some embodiments.

It should be understood that at least some of the above-described blocks of the process of FIG. 2 can be executed or performed in any order or sequence not limited to the order and sequence shown in and described in the figure. Also, some of the above blocks of the process of FIG. 2 can be executed or performed substantially simultaneously where appropriate or in parallel to reduce latency and processing times. Additionally or alternatively, some of the above described blocks of the process of FIG. 2 can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for proving the correctness of software on relaxed memory hardware, comprising:
   receiving a specification, a hardware model, and an implementation for the software to be executed on the relaxed memory hardware;
   executing a proof assistant on a collection of at least one hardware processor for evaluating the software using a sequentially consistent hardware model;
   executing the proof assistant on the collection of at least one hardware processor for evaluating the software using a relaxed memory hardware model and a write-once-kernel-mapping condition in which entries of a shared page table of the software are only written to when the entries are empty; and
   outputting an indication of whether the software is correct based on the evaluating the software using the sequentially consistent hardware model and the evaluating the software using the relaxed memory hardware model.

2. The method of claim 1, wherein the evaluating the software using a relaxed memory hardware model further uses a data-race-free (DRF)-kernel condition.

3. The method of claim 2, wherein the evaluating the software using a relaxed memory hardware model further uses a no-barrier-misuse condition.

4. The method of claim 3, wherein the evaluating the software using a relaxed memory hardware model further uses a memory-isolation condition.

5. The method of claim 4, wherein the evaluating the software using a relaxed memory hardware model further uses a transactional-page-table condition.

6. The method of claim 1, wherein the evaluating the software using a relaxed memory hardware model further uses a weak-memory-isolation condition.

7. A system for proving the correctness of software on relaxed memory hardware, comprising:
   a memory; and
   a collection of at least one hardware processor coupled to the memory and configured to:
   receive a specification, a hardware model, and an implementation for the software to be executed on the relaxed memory hardware;
   execute a proof assistant for evaluating the software using a sequentially consistent hardware model;
   execute the proof assistant for evaluating the software using a relaxed memory hardware model and a write-once-kernel-mapping condition in which entries of a shared page table of the software are only written to when the entries are empty; and
   output an indication of whether the software is correct based on the evaluating the software using the sequentially consistent hardware model and the evaluating the software using the relaxed memory hardware model.

8. The system of claim 7, wherein the evaluating the software using a relaxed memory hardware model further uses a data-race-free (DRF)-kernel condition.

9. The system of claim 8, wherein the evaluating the software using a relaxed memory hardware model further uses a no-barrier-misuse condition.

10. The system of claim 9, wherein the evaluating the software using a relaxed memory hardware model further uses a memory-isolation condition.

11. The system of claim 10, wherein the evaluating the software using a relaxed memory hardware model further uses a transactional-page-table condition.

12. The system of claim 10, wherein the evaluating the software using a relaxed memory hardware model further uses a weak-memory-isolation condition.

13. A non-transitory computer-readable medium containing computer executable instructions that, when executed by a first collection of at least one hardware processor, cause the first collection of at least one processor to perform a method for proving the correctness of software on relaxed memory hardware, the method comprising:
   receiving a specification, a hardware model, and an implementation for the software to be executed on the relaxed memory hardware;
   executing a proof assistant for evaluating the software using a sequentially consistent hardware model;
   executing the proof assistant for evaluating the software using a relaxed memory hardware model and a write-once-kernel-mapping condition in which entries of a shared page table of the software are only written to when the entries are empty; and
   outputting an indication of whether the software is correct based on the evaluating the software using the sequentially consistent hardware model and the evaluating the software using the relaxed memory hardware model.

14. The non-transitory computer-readable medium of claim 13, wherein the evaluating the software using a relaxed memory hardware model further uses a data-race-free (DRF)-kernel condition.

15. The non-transitory computer-readable medium of claim 14, wherein the evaluating the software using a relaxed memory hardware model further uses a no-barrier-misuse condition.

16. The non-transitory computer-readable medium of claim 15, wherein the evaluating the software using a relaxed memory hardware model further uses a memory-isolation condition.

17. The non-transitory computer-readable medium of claim 16, wherein the evaluating the software using a relaxed memory hardware model further uses a transactional-page-table condition.

18. The non-transitory computer-readable medium of claim 17, wherein the evaluating the software using a relaxed memory hardware model further uses a weak-memory-isolation condition.

* * * * *